(12) United States Patent
Khizroev et al.

(10) Patent No.: US 6,771,462 B1
(45) Date of Patent: Aug. 3, 2004

(54) PERPENDICULAR RECORDING HEAD INCLUDING CONCAVE TIP

(75) Inventors: Sakhrat Khizroev, Pittsburgh, PA (US); Dmitri Litvinov, Pittsburgh, PA (US); Mark H. Kryder, Bradfordwoods, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 09/665,598

(22) Filed: Sep. 19, 2000

Related U.S. Application Data (60) Provisional application No. 60/154,973, filed on Sep. 20, 1999.

(51) Int. Cl.[7] .............................................. G11B 5/187
(52) U.S. Cl. ...................................................... 360/122
(58) Field of Search ................................ 360/122, 313, 360/324, 326, 125–127

(56) References Cited

U.S. PATENT DOCUMENTS

| | | | |
|---|---|---|---|
| 3,921,217 A | * 11/1975 | Thompson | .................. 360/321 |
| 4,049,926 A | * 9/1977 | Kasatkin et al. | ............ 381/399 |
| 4,078,300 A | 3/1978 | Lazzari | |
| 4,138,702 A | 2/1979 | Magnenet | |
| 4,422,118 A | 12/1983 | Helle et al. | |
| 4,423,450 A | 12/1983 | Hamilton | |
| 4,546,398 A | 10/1985 | Toda et al. | |
| 4,575,777 A | 3/1986 | Hosokawa | |
| 4,652,956 A | 3/1987 | Schewe | |
| 4,731,157 A | 3/1988 | Lazzari | |
| 4,763,215 A | * 8/1988 | Gueugnon et al. | .......... 360/119 |

(List continued on next page.)

FOREIGN PATENT DOCUMENTS

| | | | |
|---|---|---|---|
| EP | 136157 A2 * | 4/1985 | ........... G11B/5/127 |
| GB | 948648 | 2/1964 | |
| GB | 1344890 | 1/1974 | |
| JP | 56087218 | 7/1981 | |
| JP | 57033421 | 2/1982 | |
| JP | 57198523 | 12/1982 | |
| JP | 58121124 | 7/1983 | |
| JP | 59090212 A | * 5/1984 | ........... G11B/5/12 |
| JP | 59090213 A | * 5/1984 | ........... G11B/5/12 |
| JP | 59090214 A | * 5/1984 | ........... G11B/5/12 |
| JP | 59090215 A | * 5/1984 | ........... G11B/5/12 |
| JP | 59195311 | 11/1984 | |
| JP | 62259203 A | * 11/1987 | ........... G11B/5/02 |
| JP | 63016407 | 1/1988 | |
| JP | 63197007 A | * 8/1988 | ........... G11B/5/02 |
| JP | 05298776 A | * 11/1993 | ........... G11B/11/10 |
| JP | 06229850 A | * 8/1994 | ........... G01L/3/08 |
| JP | 11039738 A | * 2/1999 | ........... G11B/11/10 |
| WO | WO 9935643 A1 * | 7/1999 | ........... G11B/11/00 |

OTHER PUBLICATIONS

"Write–Wide, Read–Narrow Vertical Recording Head," Mar. 1, 1990, IBM Technical Disclosure Bulletin, vol. No. 32, Iss. No. 10B, pp. 90–92.*

Khizroev et al., *Considerations in the Design of Probe Heads for 100 Gbit/in$^2$ Recording Density*, IEEE Transaction of Magnetics, Sep. 1997, vol. 3, No. 5, pp. 2893–2895.

TOIGO, *Avoiding a Data Crunch*, Magnetic Recording: The First 100 Years, 1999, pp. 59–74, IEEE Press.

*Primary Examiner*—William Klimowicz
(74) *Attorney, Agent, or Firm*—Alan G. Towner, Esq.; Pietragallo, Bosick & Gordon (57) ABSTRACT

A perpendicular recording head for use with magnetic recording media includes a main pole having a concave tip. The concave tip focuses the magnetic flux from the main pole onto a smaller area of the magnetic recording medium than a conventional main pole when the main pole is at its flying height from the magnetic recording medium. Although the most preferred perpendicular recording head includes a concave cavity having an elliptical profile when viewed from the side, any substantially concave cavity may be used advantageously.

8 Claims, 8 Drawing Sheets

U.S. PATENT DOCUMENTS

| | | | |
|---|---|---|---|
| 4,809,111 A | * 2/1989 | Zieren | 360/125 |
| 4,839,761 A | 6/1989 | Gatzen | |
| 4,939,609 A | * 7/1990 | Zieren et al. | 360/125 |
| 4,943,882 A | 7/1990 | Wada et al. | |
| 4,974,110 A | 11/1990 | Kanamine et al. | |
| 4,985,792 A | 1/1991 | Moir | |
| 5,016,342 A | 5/1991 | Pisharody et al. | |
| 5,035,396 A | 7/1991 | Krum et al. | |
| 5,073,836 A | 12/1991 | Gill et al. | |
| RE33,949 E | 6/1992 | Mallary et al. | |
| 5,225,953 A | 7/1993 | Wada et al. | |
| 5,241,430 A | 8/1993 | Janz | |
| 5,430,589 A | 7/1995 | Moir et al. | |
| 5,486,967 A | 1/1996 | Tanaka et al. | |
| 5,621,595 A | 4/1997 | Cohen | |
| 5,680,283 A | * 10/1997 | Tanaka et al. | 360/125 |
| 5,726,840 A | * 3/1998 | Uemura et al. | 360/122 |
| 5,729,412 A | * 3/1998 | Uemura et al. | 360/122 |
| 5,738,927 A | 4/1998 | Nakamura et al. | |
| 5,796,557 A | 8/1998 | Bagnell et al. | |
| 5,844,749 A | * 12/1998 | Sakai et al. | 360/236.6 |
| 5,996,045 A | 11/1999 | Lee et al. | |
| 6,016,290 A | * 1/2000 | Chen et al. | 369/13.17 |
| 6,282,056 B1 | 8/2001 | Feng et al. | |

* cited by examiner

PERPENDICULAR RECORDING HEAD INCLUDING CONCAVE TIP

CROSS REFERENCE TO RELATED APPLICATION

This application claims the benefit of U.S. Provisional patent application No. 60/154,973, filed Sep. 20, 1999.

BACKGROUND OF THE INVENTION

1. Field of the Invention

The invention is a perpendicular recording head for use with magnetic storage media. The perpendicular recording head has a tip with a concave surface for concentrating the magnetic flux over a smaller portion of the magnetic storage medium's surface area than current perpendicular recording heads.

2. Description of the Related Art

Although other perpendicular recording heads have been developed, the present invention improves upon presently known perpendicular recording heads by utilizing a concave cavity to focus magnetic flux, or being dimensioned and configured to focus magnetic flux at a distance approximating the flying height of the recording head.

An example of a magnetic recording head is described in U.S. Pat. No. 4,078,300, issued to J. P. Lazzari on Mar. 14, 1978. This patent describes a method of making a magnetic recording head intended to work in conjunction with a track of a magnetic storage medium having a narrow width.

U.S. Pat. No. 4,138,702, issued to J. G. Magnenet on Feb. 6, 1979, describes a head arrangement for perpendicular recording on a magnetic record carrier. The head arrangement has an electromagnet with a core and a magnetic shunt on opposite sides of the magnetic recording medium.

U.S. Pat. No. 4,546,398, issued to J. Toda et al. on Oct. 8, 1985, describes a perpendicular recording head. The perpendicular recording head includes a main pole made from a thin magnetic film, and a spiral coil electromagnetically coupled to the main pole.

U.S. Pat. No. 4,652,956, issued to H. Schewe on Mar. 24, 1987, describes a recording head for perpendicular magnetization. The recording head has a pair of magnetic legs forming a ring-shaped member, and separate read and write wire coils. The read coil is located between the two magnetic legs, and the write coil is located outside one of the two magnetic legs.

U.S. Pat. No. 4,731,157, issued to J. P. Lazzari on Mar. 15, 1988, describes a process for making a perpendicular recording head. The process includes the steps of depositing magnetic film on an insulating substrate, etching a channel in the magnetic film for containing a coil within a dielectric material, etching another channel in the dielectric layer for containing a second magnetic film, removing dielectric material to expose the lateral edge of the second magnetic film, and depositing additional dielectric material on top of the second magnetic film.

U.S. Pat. No. 4,943,882, issued to T. Wada et al. on Jul. 24, 1990, describes a perpendicular recording head. The recording head includes a first main pole surrounded by a conductor coil, with an insulator covering the first main pole and coil. The first main pole is in contact with a magnetic substrate at its top end. A second main pole is in contact with the first main pole. This assembly is covered with a protective overcoat. A similar recording head is described in U.S. Pat. No. 5,225,953, also issued to T. Wada et al. on Jul. 6, 1993.

U.S. Pat. No. 4,974,110, issued to M. Kanamine et al. on Nov. 27, 1990, describes a perpendicular recording head having a main magnetic pole, a spiral coil surrounding the main pole, and a pair of auxiliary magnetic poles on either side of the main pole. The magnetic flux from the resulting two magnetic leakage paths and the coil cancel each other out, thereby reducing edge noise.

U.S. Pat. No. 4,985,792, issued to M. B. Boir on Jan. 15, 1991, and assigned to the assignee of the present inventors, describes an improved spindle motor for a fixed disk drive for a computer.

U.S. Pat. No. 5,035,396, issued to R. G. Krum et al. on Jul. 30, 1991, and assigned to the assignee of the present inventors, describes a disk drive having a sealed disk drive housing, a common chassis for the disk drive and printed circuit board, and a floating bushing connecting the circuit board to the disk drive housing.

U.S. Pat. No. 5,073,836, issued to H. S. Gill et al. on Dec. 17, 1991, describes a perpendicular recording head. The primary magnetic pole is separated from the auxiliary pole by a distance sufficient to increase the reluctance of the recording head, thereby minimizing erasure of data within the recording medium.

U.S. Pat. No. 5,241,430, issued to D. W. Janz on Aug. 31, 1993, and assigned to the assignee of the present inventors, describes a disk drive which accepts write operations during manufacture, but only accepts read operations in use. The drive's controller responds to power supply voltage levels available to the user's computer by performing only read operations, but will perform a write operation in response to a higher voltage.

U.S. Pat. No. 5,430,589, issued to M. B. Moir et al. on Jul. 4, 1995, and assigned to the assignee of the present inventors, describes a disk drive having a vibration-absorbing insulator between the housing and the shaft for the storage disks.

U.S. Pat. No. 5,486,967, issued to Y. Tanaka et al. on Jan. 23, 1996, describes a perpendicular recording head having a pair of main poles, and which is in contact with the magnetic disk during use.

U.S. Pat. No. 5,738,927, issued to A. Nakamura et al. on Apr. 14, 1998, describes a perpendicular magnetic recording medium having a substrate and a film having perpendicular magnetic anisotropy formed over the substrate. A protective film covers the magnetic film.

U.S. Pat. No. 5,796,557, issued to G. N. Bagnell et al. on Aug. 18, 1998, and assigned to the assignee of the present inventors, describes a disk drive including six storage disks and fitting within a 3.5 inch, half height port.

U.S. Pat. No. 5,996,045, issued to L. Lee et al. on Nov. 30, 1999, and assigned to the assignee of the present inventors, describes a disk drive arrangement combining a master drive and a slave drive. Both drives use the same IDE bus. The host computer is able to send commands over the IDS bus in the same manner as if only one disk drive was present, and the command is then carried out by the appropriate drive.

The article, Sakhrat K. Khizroev, James A. Bain, and Mark H. Kryder, "Considerations in the design of Probe Heads for 100 Gbit/in$^2$ Recording Density," *IEEE Transactions on Magnetics* (September, 1997) pp. 2893–2895, describes work performed by two inventors of the present invention towards development of giant magnetoresistive read heads capable of reading magnetic storage media having high storage densities.

The article, Jon William Toigo, "Avoiding a Data Crunch," *Scientific American* (May, 2000) pp. 58–74, describes several approaches to increasing the information storage density within fixed computer drives.

None of the above described patents and publications describes a perpendicular recording head for use with magnetic recording media having a concave cavity at its tip for concentrating the magnetic flux within the storage layer of the magnetic storage medium. Additionally, none of the above patents and publications describes a recording head permitting the recording densities possible with the present invention.

SUMMARY OF THE INVENTION

The present invention is a perpendicular recording head for use with magnetic recording media having a main pole with a tip having a concave surface. The concave surface concentrates magnetic flux from the main pole to a higher density than a conventional perpendicular recording head at a distance approximating the flying height of the head, thereby permitting a greater amount of information to be stored on the magnetic recording medium. Although not limited to such use, a perpendicular recording head of the present invention is particularly useful for fixed (also known as hard) computer disk drives.

A typical perpendicular recording head includes a main pole, an opposing pole magnetically coupled to the main pole, and an electrically conductive wire coil surrounding the main pole. The bottom of the opposing pole will typically have a surface area greatly exceeding the surface area of the main pole's tip. Electrical current flowing through the coil creates a flux through the main pole. The direction of the flux may be reversed by reversing the direction of current flow through the coil.

A typical magnetic recording medium for use in conjunction with a perpendicular recording head includes an upper layer having a plurality of magnetically permeable tracks separated by nonmagnetic transitions, and a magnetically permeable lower level. The lower level is magnetically soft relative to the tracks.

To write to the magnetic recording medium, the recording head is separated from the magnetic recording medium by a distance known as the flying height. The magnetic recording medium is moved past the recording head so that the recording head follows the tracks of the magnetic recording medium, with the magnetic recording medium first passing under the opposing pole and then passing under the main pole. Electricity is passed through the coil to create magnetic flux within the main pole. The magnetic flux will pass from the main pole through the track, into the lower layer, and across to the opposing pole. The flux will thereby cause the magnetic fields in the tracks to align with the magnetic flux of the recording head. Changing the direction of electric current changes the direction of the flux created by the recording head and therefore the magnetic fields within the magnetic recording medium. Because the surface area of the opposing pole is significantly greater than the surface area of the main pole, only the main pole will have a sufficient concentration of magnetic flux to influence the magnetic fields in the magnetic recording medium.

Reading from the magnetic recording medium follows the opposite procedure. The magnetic flux of the magnetic recording medium will pass through the main pole as the main pole is passed over the recording medium. Whenever there is a change in the magnetic fields of the recording medium, the flux within the main pole will change accordingly. Such changes in flux will induce a current within the coil. Alternatively, a magnetoresistive or giant magnetoresistive read head may be used with the present invention.

The density with which information may be recorded on the magnetic recording medium is limited by the effect of the recording head's magnetic flux on neighboring regions of the magnetic recording medium during read and write operations. Each discrete sector of the magnetic recording medium must be sufficiently distant from neighboring sectors so that magnetic flux from the recording head will only affect that sector which the recording head is directly over. A typical perpendicular recording head, having a flat tip, will create a significant amount of flux spreading out towards the surrounding sectors. The present invention minimizes this problem by using a head with a concave tip.

It is well known in physics that magnetic flux passing through the surface of magnetically permeable material will always be perpendicular to that surface. Therefore, magnetic flux passing through a flat main pole tip will exit the pole tip with all flux lines being parallel. After exiting the pole tip, the flux lines will then tend to diverge from each other. By using a concave main pole tip, the flux lines are first focused a short distance from the main pole tip, thereby preventing them from diverging from each other within the short distance from the pole tip through the magnetic storage medium's upper layer. By concentrating the magnetic flux on a smaller area of the magnetic recording medium, the recording medium may use smaller sectors without the recording head influencing the magnetic field of more than one sector at a time, thereby permitting more sectors to be contained on a disk.

In a most preferred embodiment, the main pole tip's concave cavity in the main pole tip will have a curved cross section when viewed from any side, for example, ellipsoidal or hemispherical. Such a cross section may be dimensioned and configured to concentrate magnetic flux within the center of the magnetic recording medium's upper level when the recording head and recording medium are separated by the flying height of the recording head.

It is therefore an aspect of the present invention to provide a perpendicular recording head defining a cavity at the tip of the main pole.

It is another aspect of the present invention to provide a perpendicular recording head being dimensioned and configured to concentrate magnetic flux within the magnetic recording medium.

It is a further aspect of the present invention to provide a perpendicular recording head defining a concave, ellipsoidal or hemispherical cavity.

It is another aspect of the present invention to provide a magnetic recording apparatus wherein information can be stored at greater densities.

It is a further aspect of the present invention to provide a magnetic recording apparatus wherein a magnetic recording medium having a higher level of coercivity may be utilized.

It is another aspect of the present invention to provide a perpendicular recording head having a higher sensitivity during read operations.

It is a further aspect of the present invention to provide a method of storing data on a magnetic storage medium utilizing a perpendicular recording head of the present invention, thereby providing for higher information storage densities than were possible with other recording heads.

It is another aspect of the present invention to provide a method of manufacturing a perpendicular recording head adapted to permit recording on magnetic storage media at higher information densities than were available in the past.

These and other aspects of the invention will become more apparent through the following description and claims.

BRIEF DESCRIPTION OF THE DRAWINGS

Like reference numbers denote like elements throughout the drawings.

DETAILED DESCRIPTION OF THE PREFERRED EMBODIMENTS

The present invention is a perpendicular recording head for use with magnetic recording media. The recording head includes a main pole having a tip, with a concave cavity defined within the tip. As used herein, recording head means a head adapted for read and/or write operations.

Figure 1:
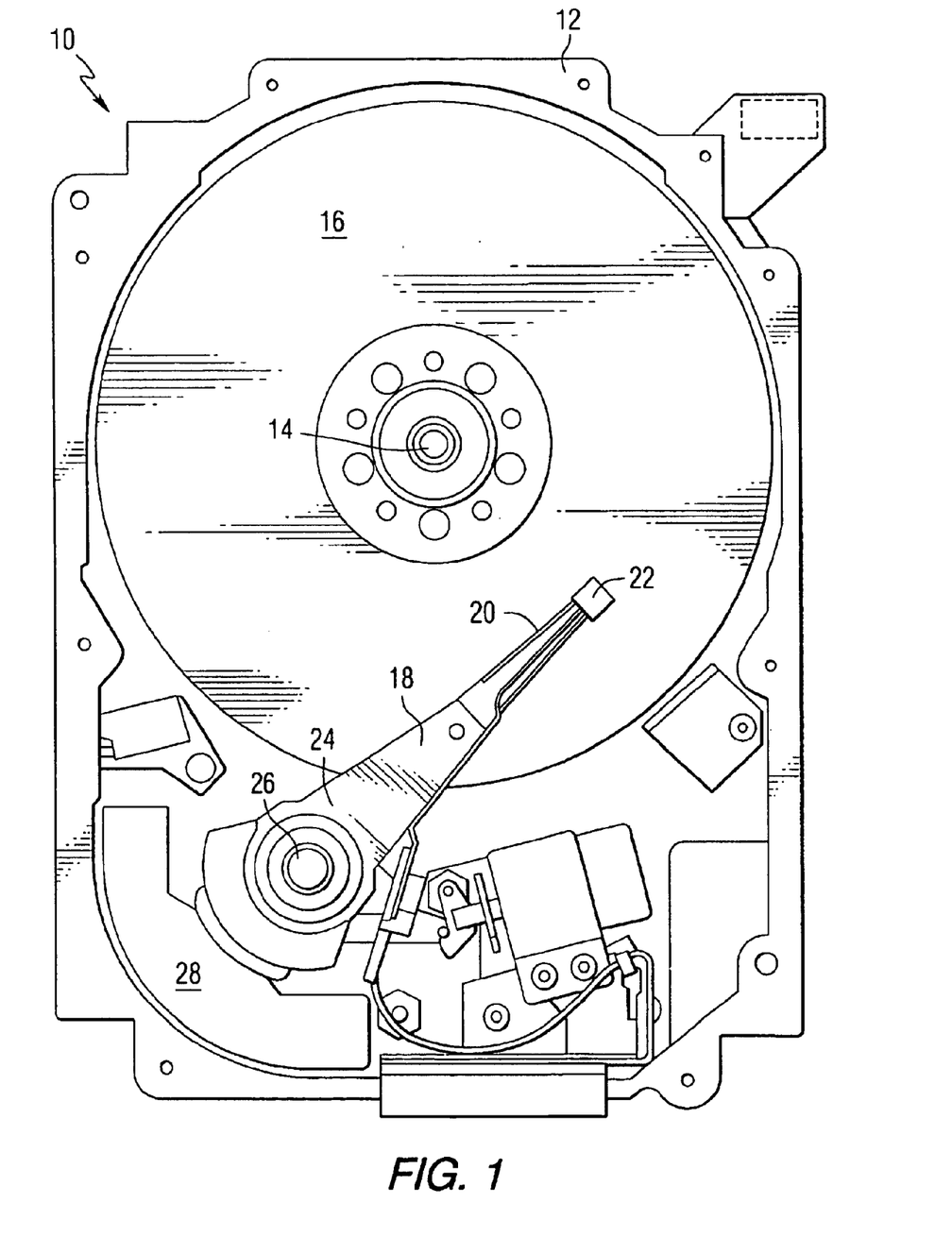
FIG. 1 is a top view of a typical hard disk drive for a computer for which the present invention may be used, illustrating the disk drive with its upper housing portion removed.

The invention is best described in relation to presently known perpendicular recording heads used within a fixed disk drive 10 for computers, one of which is illustrated in FIG. 1. The fixed disk drive 10 includes a housing 12 (with the upper portion removed and the lower portion visible in this view for maximum clarity) dimensioned and configured to contain and locate the various components of the disk drive 10. The disk drive 10 includes a spindle motor 14 for rotating at least one magnetic storage medium 16 within the housing, in this case a magnetic disk. At least one arm 18 is contained within the housing 12, with each arm 18 having a first end 20 with a perpendicular recording head 22, and a second end 24 pivotally mounted to a bearing 26. An actuator motor 28, such as a movable coil DC motor, is located at the arm's second end 24, pivoting the arm 18 to position the head 22 over a desired sector of the disk 16. The actuator motor 28 is regulated by a controller which is not shown, and which is well known.

Figure 2:
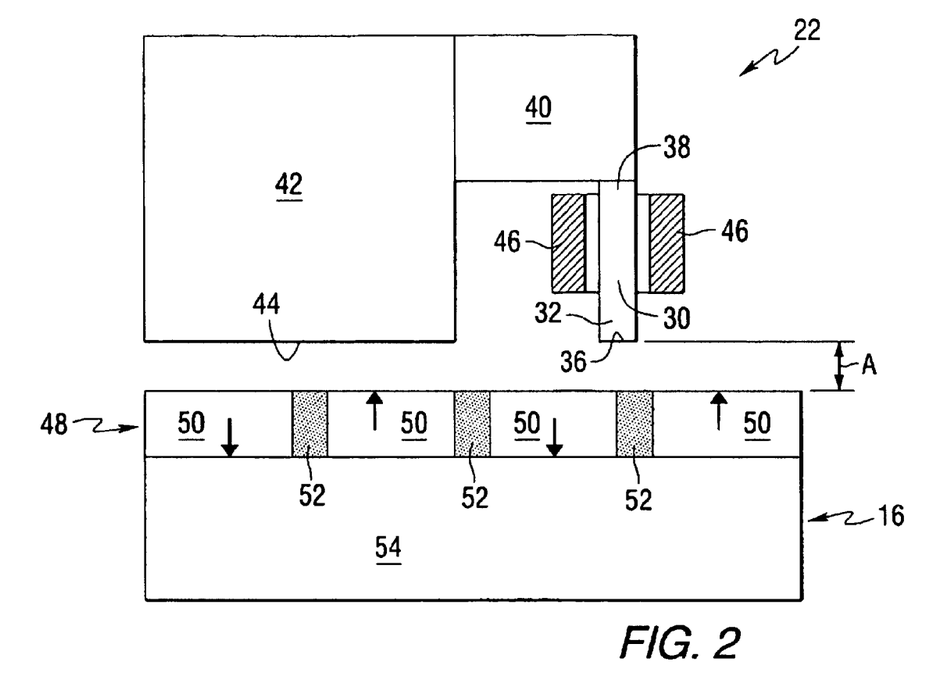
FIG. 2 is a side, partially sectional view of a perpendicular recording head according to the present invention.
Figure 3:
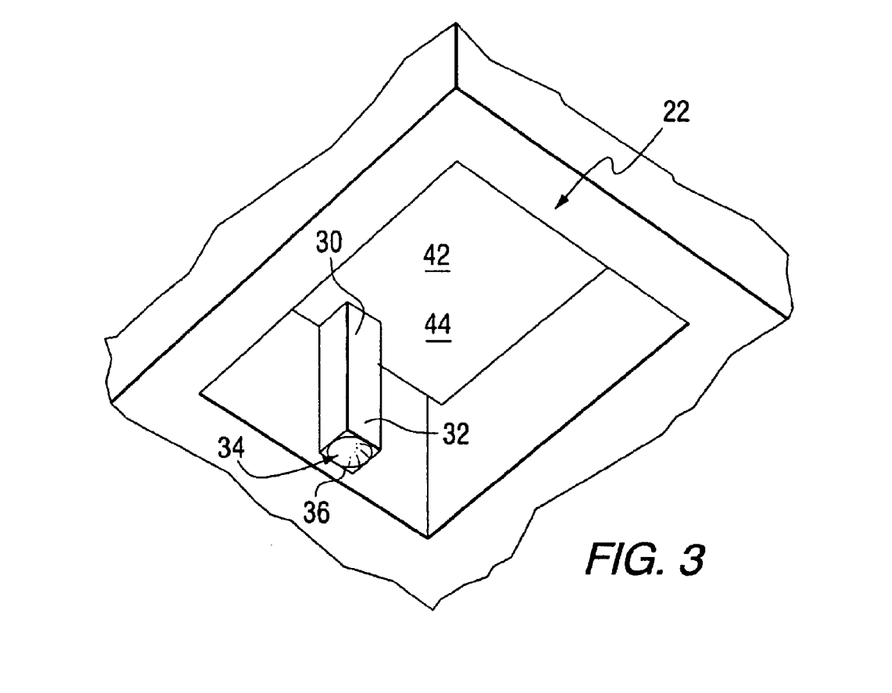
FIG. 3 is a bottom perspective view of a perpendicular recording head according to the present invention.

The features of a perpendicular recording head 22 and corresponding magnetic storage disk 16 are best illustrated in FIGS. 2–3. The perpendicular recording head 22 includes a magnetically permeable main pole 30, oriented substantially perpendicular to the magnetic recording medium 16, and including a tip 32. A tip 32 of the present invention defines a cavity 34 within its bottom surface 36, the structure and advantages of which will be described in greater detail below. The top 38 of the main pole 30 is secured to a magnetically permeable joint 40. The opposite end of the joint 40 has a magnetically permeable opposing pole 42 secured to it. The opposing pole 42 includes a bottom surface 44 having a significantly larger surface area than the bottom surface 36 of main pole 30. With the exception of the joint 40, the main pole 30 and opposing pole 42 are separated by nonmagnetic material (not shown, but well known). An electrically conductive wire coil 46 surrounds the main pole 30. Although not shown and well understood by those skilled in the art, coil 46 is connected to a power supply capable of supplying electrical current flowing in either direction through the coil 46, and controlled by an appropriate controller for changing the current direction as necessary to produce the desired changes in the orientation of the main pole's magnetic field.

Referring to FIG. 2, a magnetic storage medium 16, here a magnetic disk, for use with a perpendicular recording head 22 is illustrated. The disk 16 includes an upper layer 48 having a plurality of magnetically permeable tracks 50, which are divided into sectors, with each sector having several different magnetic fields within the magnetically permeable material (not shown and well understood). The tracks 50 are separated by nonmagnetic transitions 52. The disk 16 also includes a magnetically permeable lower layer 54, which is magnetically soft relative to the tracks 50. In use, the disk 16 will be separated from the tip 32 of main pole 30 by a flying height A. The flying height A is sufficiently small so that a high concentration of flux from main pole 30 will pass through track 50, but sufficiently large to prevent damage to disk 16 from contact with recording head 22.

Recording is accomplished by rotating the disk 16 relative to recording head 22 so that the recording head 22 is located above the appropriate sectors of tracks 50. As recording progresses, the disk 16 will first pass under the opposing pole 42, then the main pole 30. Current will be supplied to the coil 46, thereby inducing a magnetic field within the main pole 30. The greatest concentration of flux from this magnetic field will pass from the tip 32 of main pole 30 through the track 50 directly under the main pole 30 on which recording is being carried out, the lower layer 54, through a different track 50 directly under the opposing pole 42, continuing through opposing pole 42 and joint 40, and finally forming a complete loop back through the top 38 of main pole 30. As a portion of a sector of track 50 passes under main pole 30, the orientation of its magnetic field will correspond to the orientation of the magnetic field of main pole 30, which will be perpendicular to the disk 16. As main pole 30 passes over disk 16, the direction of current passing through coil 46 will remain constant when a binary "0" is being recorded, thereby creating consistent orientation of the magnetic field within track 50. The current passing through coil 46 will reverse directions when a binary "1" is being recorded, thereby changing the orientation of the magnetic field within track 50. The opposing pole 42 does not affect the magnetic fields within upper layer 48 because the large surface area relative to main pole 30 results in a significantly lower flux concentration through opposing pole 42 than through main pole 30.

Reading from the disk 16 may be accomplished either using the same head 22, or with a separate, identical read head adjacent to the write head 22, or with a different style read head that may also benefit from a concave pole tip, as explained below. If the same head or another identical head is used for reading and writing, then reading is accomplished by rotating disk 16 relative to recording head 22 so that the desired sectors of tracks 50 pass under main pole 30. As the main pole 30 passes over a magnetic field within a track 50, the flux from the magnetic field passes through the track 50, through main pole 30, joint 40, opposing pole 42, through another track 50, (at a much lower flux density due to the larger surface area of opposing pole 42 relative to main pole 30), and back through lower layer 54 to the track 50 from which reading is taking place. Main pole 30 will therefore receive a magnetic field with a flux direction corresponding to the flux direction of that portion of the track 50 directly under main pole 30. When main pole 30 is passing over a region of track 50 with a uniform flux direction, no current is induced in coil 46, thereby resulting in a binary "0" being read. When main pole 30 passes over a section of track 50 wherein the magnetic flux reverses direction, a current is induced in coil 46, thereby resulting in a binary "1" being read.

Figure 17:
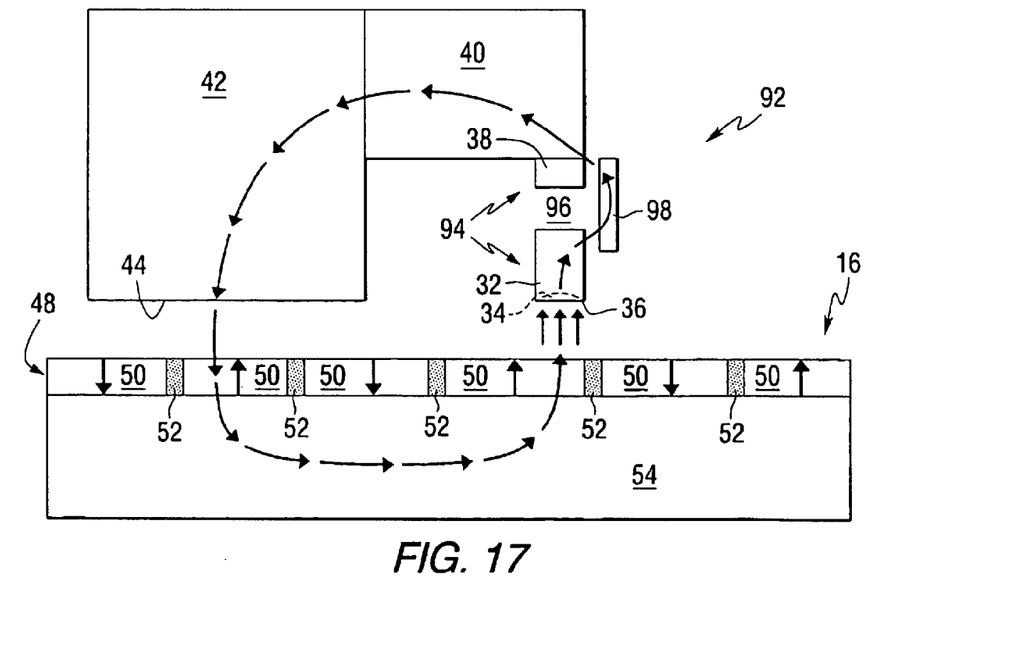
FIG. 17 is a side, partially sectional view of a perpendicular read head according to the present invention.
Figure 18:
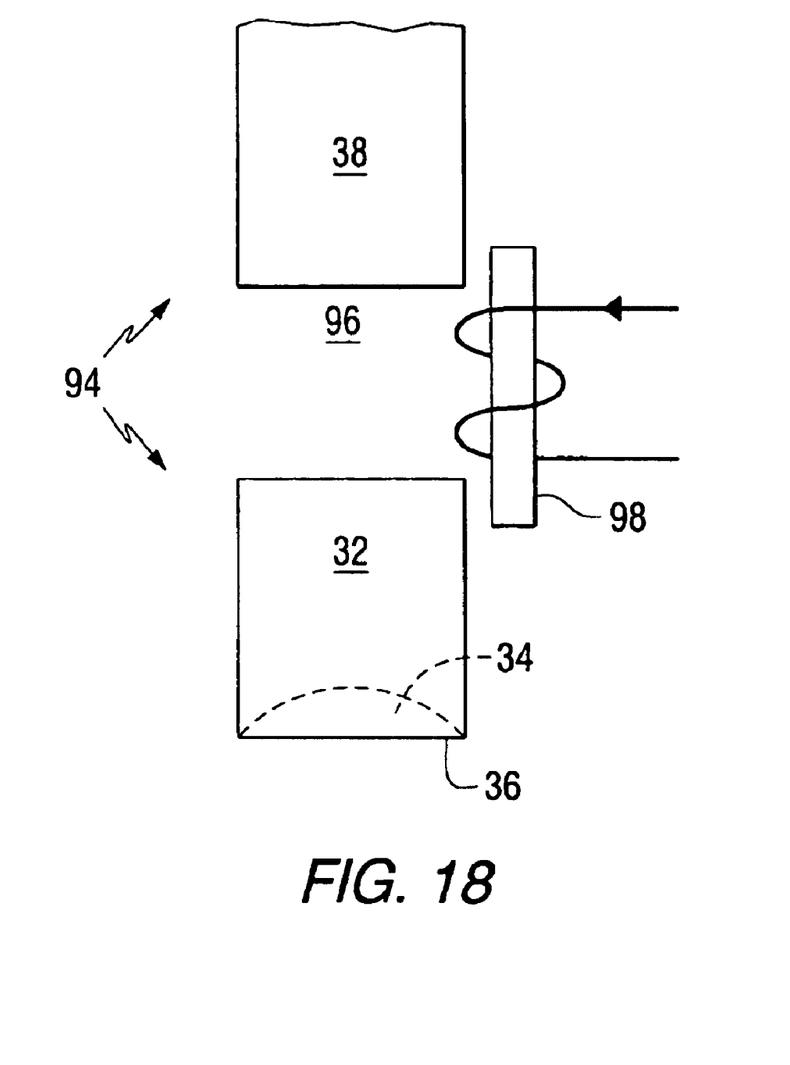
FIG. 18 is a side view of a perpendicular read head of the present invention.

Alternatively, a magnetoresistive (hereinafter MR) or giant magnetoresistive (hereinafter GMR) read head 92 may be included at the first end 20 of arm 18, immediately adjacent to the write head 22. GMR read heads are well known, but will be described briefly herein for purposes of illustrating the advantages of the present invention as applied to GMR read heads. A GMR read head 92 is illustrated in FIGS. 17–18. The GMR read head 92 includes a magnetically permeable main pole 94, oriented substantially perpendicular to the magnetic recording medium 16, and including a tip 32. A tip 32 of the present invention defines a cavity 34 within its bottom surface 36, the structure and advantages of which will be described in greater detail below. The center 96 of the main pole 94 is split, separating the top 38 from the tip 32 with nonmagnetic material. The top 38 and tip 32 are magnetically bridged by a GMR read element 98, so that magnetic flux will flow between the top 38 and tip 32 by passing through the GMR read element 98. The top 38 of the main pole 94 is secured to a magnetically permeable joint 40. The opposite end of the joint 40 has a magnetically permeable opposing pole 42 secured to it. The opposing pole 42 includes a bottom surface 44 having a significantly larger surface area than the bottom surface 36 of main pole 30. With the exception of the joint 40, the main pole 30 and opposing pole 42 are separated by nonmagnetic material (not shown, but well known). Although not shown and well understood by those skilled in the art, head 92 is connected to and controlled by an appropriate controller for properly reading from the magnetic storage medium 16.

As before, reading is accomplished by rotating disk 16 relative to read head 92 so that the desired sectors of tracks 50 pass under main pole 30. As the main pole 94 passes over a magnetic field within a track 50, the flux from the magnetic field passes through the track 50, through main pole 94, joint 40, opposing pole 42, through another track 50, (at a much lower flux density due to the larger surface area of opposing pole 42 relative to main pole 92), and back through lower layer 54 to the track 50 from which reading is taking place. Main pole 94 will therefore receive a magnetic field with a flux direction corresponding to the flux direction of that portion of the track 50 directly under main pole 30. Because the main pole 94 is split, the magnetic flux flowing through the main pole 94 is forced through GMR read element 98. Changes in magnetic flux within the main pole 94 will change the electrical resistance within the GMR read element 98. For example, magnetic flux oriented in a first direction will produce a first level of electrical resistance within GMR element 98. Reversing the direction of magnetic flux will produce a second level of magnetic resistance within GMR element 98. A constant level of resistance will be read as a binary "0." Likewise, a change in resistance will be read as a binary "1."

From the above description, it becomes apparent that, if the individual magnetic fields are too close to each other within the upper layer 48, the process of writing to the magnetic storage medium 16 will affect not only the desired location on the disk, but also neighboring locations. Therefore, maximizing flux density within a desired section of a track 50 while minimizing flux density within neighboring sections of upper layer 48 permits tracks 50 to be smaller, thereby permitting a greater number of tracks 50 within a disk, and allowing the disk to store additional information. Additionally, concentrating the flux density within only the track 50 directly below the recording head 22 will permit the same flux density within the track 50 to be achieved by a lower power level. Alternatively, concentrating the magnetic flux will increase flux density at the same power level, thereby permitting a track 50 to be magnetically harder (have a higher coercivity) at the same power level.

Figure 4:
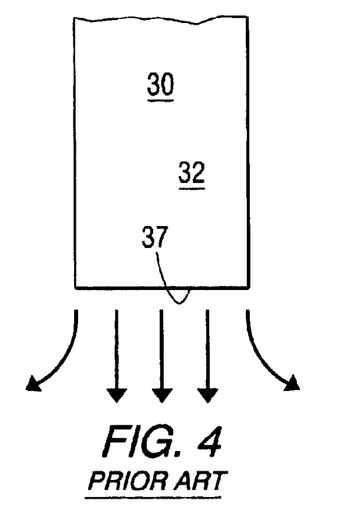
FIG. 4 is a side view of the tip of a prior art perpendicular recording head, showing the magnetic flux pattern from such a recording head.
Figure 5:
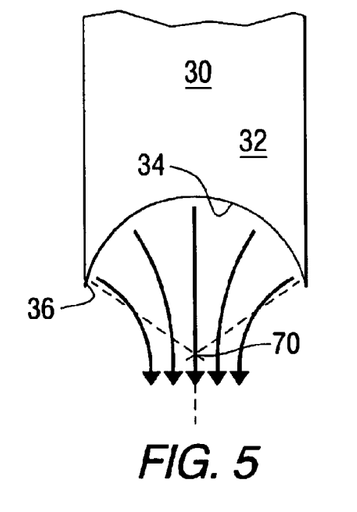
FIG. 5 is a side view of a perpendicular recording head of the present invention, showing the magnetic flux pattern from such a recording head.

A recording head 22 of the present invention accomplishes this by using the cavity 34 of the main pole tip 32 to focus flux on a small portion of upper layer 48, concentrating the magnetic field and minimizing diffusion of flux to neighboring portions of upper layer 48. The advantage is best illustrated in FIGS. 4–5. It is well known that magnetic flux exits the surface of a magnetically permeable material perpendicular to that surface, and then forms a continuous loop, reentering the magnetically permeable material at its opposite pole, also perpendicular to the surface at that point. As shown in FIG. 4, a conventional perpendicular recording head having a main pole 30 with a flat bottom 37 will direct most of the magnetic flux parallel to the bottom 37 immediately adjacent to the bottom 37, but some portion of the flux diverges or spreads out as it leaves the flat tip 37, and produces a magnetic field with an enlarged area at a distance approximating the flying height A. Conversely, flux from a recording head 22 of the present invention, as it exits parallel to the surface of cavity 34, will begin to converge, preferably reaching a maximum concentration a short distance from the bottom surface 36. A most preferred embodiment defines a concave cavity having a curved, such as ellipsoidal or hemispherical, cross section when viewed from the side, best illustrated in FIGS. 6–8. Such a cavity can be dimensioned and configured so that the flux converges to its maximum density within a track 50 when the recording head 22 and disk 16 are separated by the flying height A. A typical main pole 30 will have a width W of 100 to 300 nm and thickness T of 100 to 600 nm, with a suggested ratio of width W to thickness T being 6:1. The cavity 34 preferably extends 30 to 200 nm deep into the main pole 30.

Figure 6:
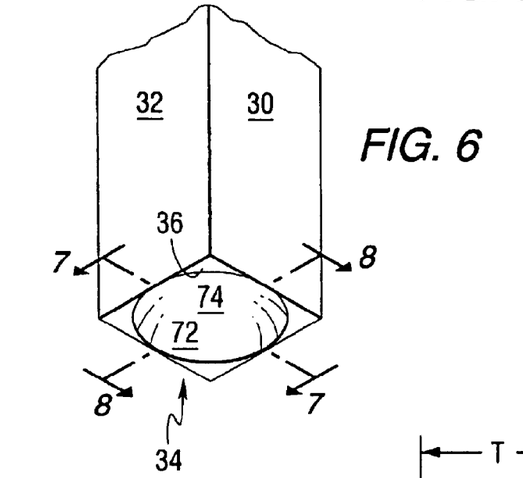
FIG. 6 is a bottom perspective view of a first embodiment of a perpendicular recording head according to the present invention.
Figure 7:
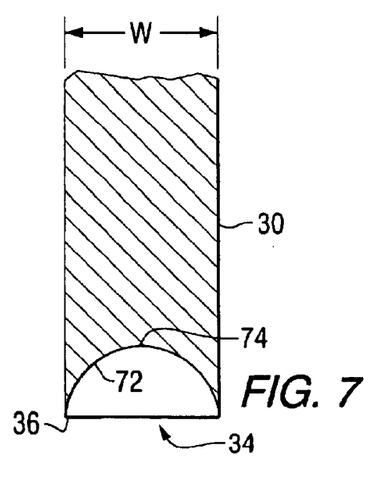
FIG. 7 is a side cross sectional view of a first embodiment of a perpendicular recording head according to the present invention, taken along the lines 7—7 in FIG. 6.
Figure 8:
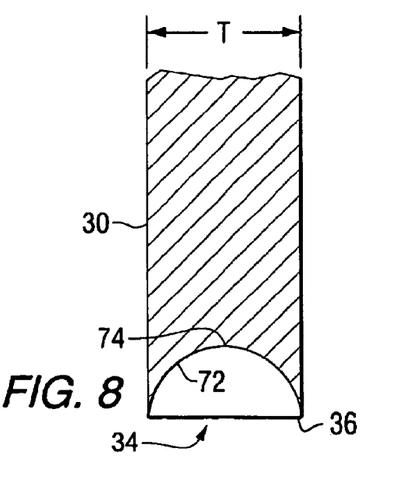
FIG. 8 is a side cross sectional view of a first embodiment of a perpendicular recording head according to the present invention, taken along the lines 8—8 in FIG. 6.
Figure 9:
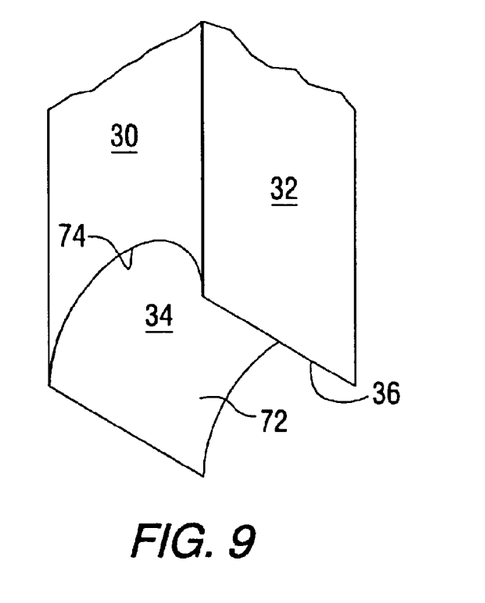
FIG. 9 is a bottom perspective view of a second embodiment of a perpendicular recording head according to the present invention.
Figure 10:
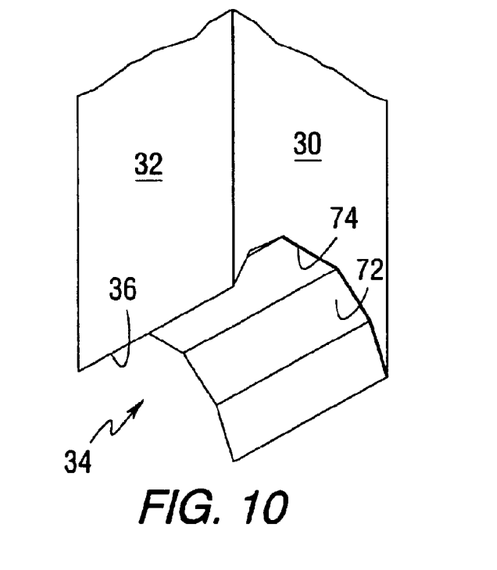
FIG. 10 is a bottom perspective view of a third embodiment of a perpendicular recording head according to the present invention.
Figure 11:
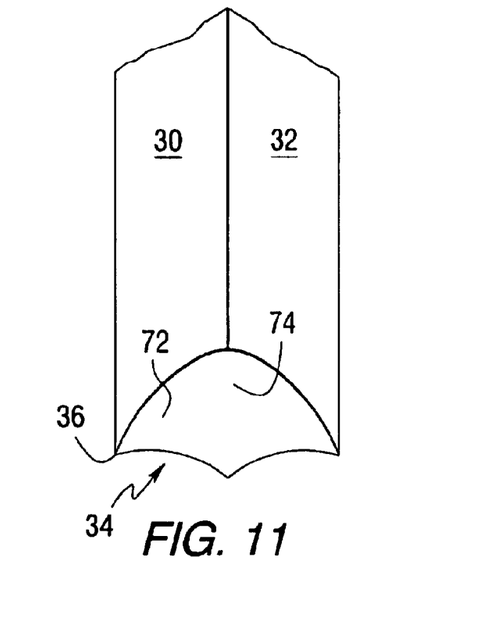
FIG. 11 is a bottom perspective view of a fourth embodiment of a perpendicular recording head according to the present invention.
Figure 12:
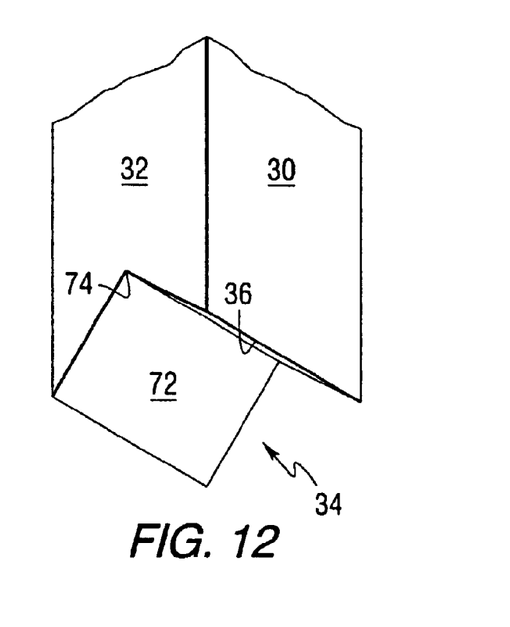
FIG. 12 is a bottom perspective view of a fifth embodiment of a perpendicular recording head according to the present invention.
Figure 13:
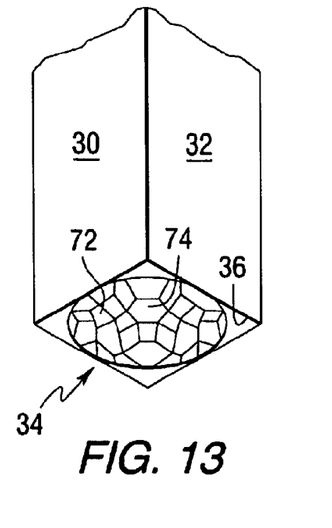
FIG. 13 is a bottom perspective view of a sixth embodiment of a perpendicular recording head according to the present invention.
Figure 14:
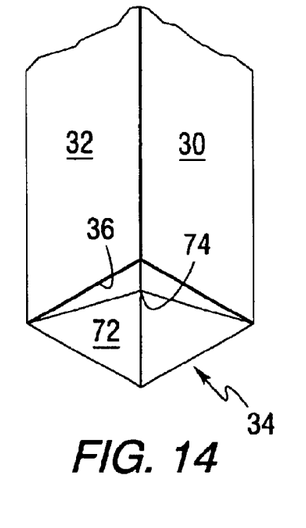
FIG. 14 is a bottom perspective view of a seventh embodiment of a perpendicular recording head according to the present invention.

Although a substantially hemispherical cavity is shown in FIGS. 6–8, several other cavities may be used within perpendicular recording heads to improve their efficiency over a conventional perpendicular recording head. Alternative embodiments include cavities having curved or faceted elliptical, semicircular, or parabolic cross sections when viewed from a single direction (FIGS. 9 and 11), cavities (FIGS. 6, 13, and 14), a channel parallel to either the thickness or width of the main pole 30 (FIGS. 9–10 and 12) or horizontal and angled with respect to width and/or thickness (FIG. 11), or a faceted approximation of any of the above (FIGS. 10 and 12–14). Any cavity having sloped sides 72 adapted to focus at least a portion of the magnetic flux towards the central axis of the main pole 30, and having a depth sufficiently small so that the top 74 of the cavity 34 is not too far from the magnetic recording medium 16 when the main pole's bottom 36 is at flying height A to substantially reduce flux concentration within the track 50, will be advantageous as compared to conventional perpendicular recording heads, and should be considered to be substantially concave for purposes of this description and claims. This description and accompanying figures provide only representative examples of the many possible cavities 34, not an inclusive list of all that will work. Additionally, although the main poles 34 are all illustrated square or rectangular, nothing is known to limit a main pole 30 to this shape.

Figure 15:
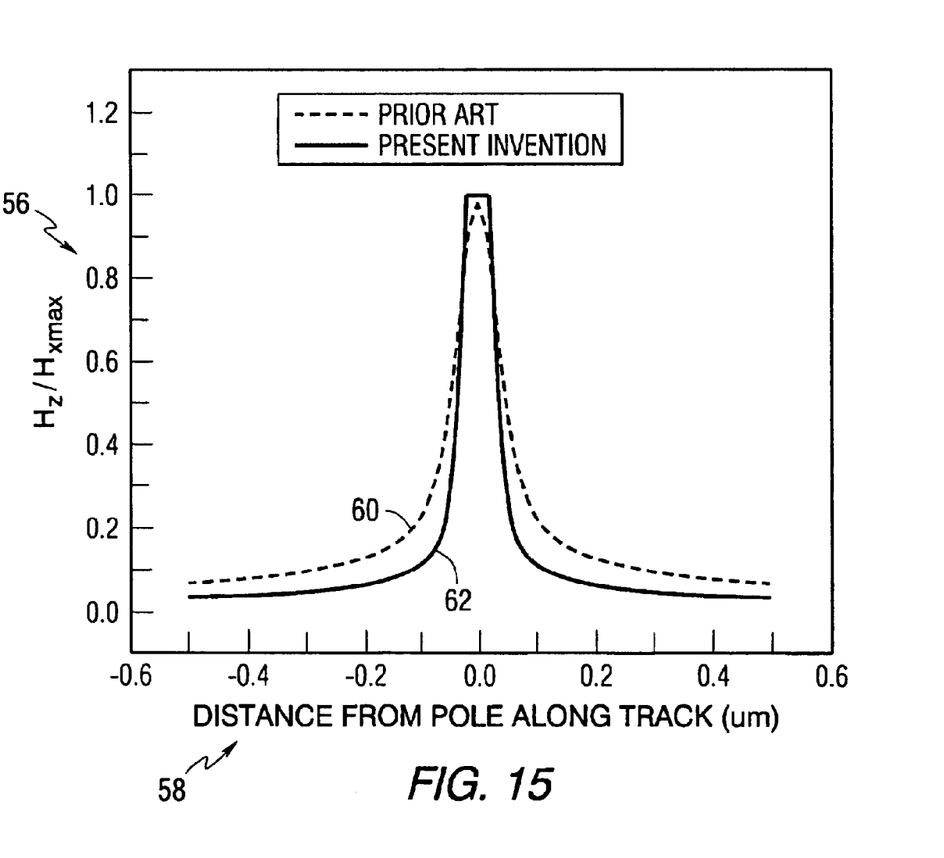
FIG. 15 is a graph comparing magnetic flux density of prior art perpendicular recording heads with a perpendicular recording head of the present invention.
Figure 16:
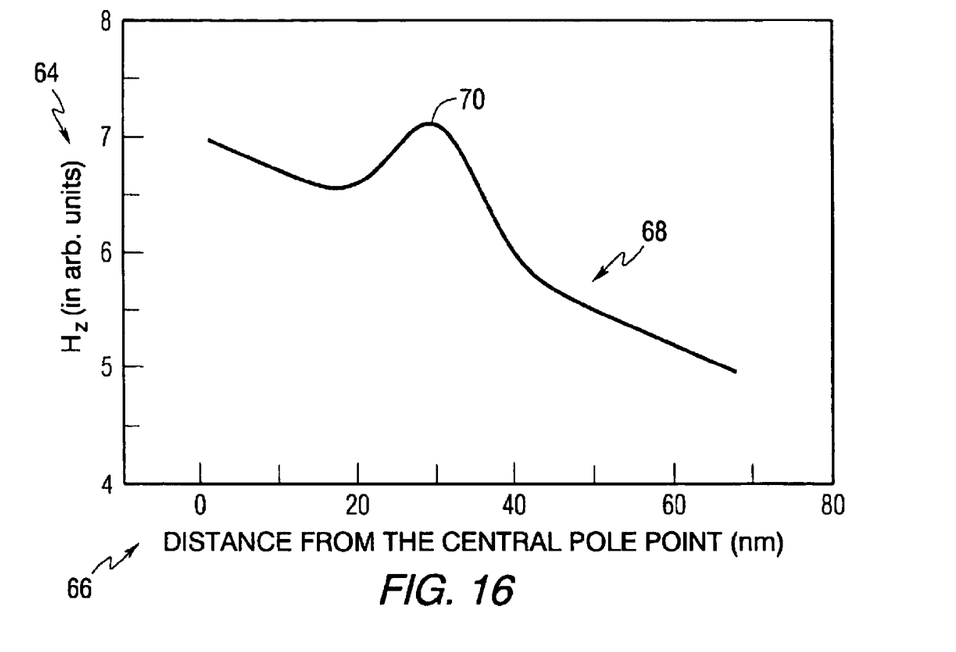
FIG. 16 is a graph showing magnetic flux density as a function of distance from the pole tip of a perpendicular recording head of the present invention.

The advantages in flux concentration resulting from the present invention are best illustrated in FIGS. 15–16. FIG. 15 illustrates the perpendicular component of the magnetic field 56 as a function of distance from the tip 32 (reference number 58 corresponds to the x-axis) at a flying height A of 10 nm for both a prior art tip 32 (line having reference number 60) and a tip 32 of the present invention (line having reference number 62). As compared to the prior art, a recording head 22 of the present invention both maximizes flux density immediately underneath the tip 32, and minimizes the flux density across surrounding parts of the magnetic storage medium 16. This flux pattern enables tracks 50 to be made smaller without the risk of a write operation to one track 50 affecting a neighboring track 50. FIG. 16 illustrates the flux density resulting from the most preferred embodiment of the tip 32 (reference number 64 in the drawing) as a function of distance from the bottom surface 36 of main pole 30 (reference number 66 in the drawing). Typically, magnetic flux density will decrease with increasing distance from the magnet, as illustrated by the generally downward slope of line 68. However, due to the focusing effect of the concave surface 34, the magnetic flux density reaches a maximum a short distance from the bottom surface 36 before continuing to decrease, forming a focal point 70. The curved surface 34 may be dimensioned and configured so that, at a flying height A, the focal point 70 occurs at the center of a track 50.

Further demonstrating the advantage of a perpendicular recording head of the present invention, the attainable field strength for write operations has been calculated to be almost double the field strength of prior art recording heads. For a preferred embodiment at a 10 nm flying height, field strength was calculated to be 7800 Oe as compared to 4800 Oe. Additionally, based on the reciprocity principle, the same preferred embodiment has been calculated to have more than double the sensitivity of a conventional perpendicular recording head for read operations for a conventional perpendicular recording head. Therefore, the tracks 50 may not only be thinner, allowing more tracks 50 per disk 16, but the tracks 16 may be made from media with higher coercivity, which will therefore be able to store higher densities of information. Quantifying the advantage, a preferred recording head was tested using a 50 nm thick recording layer and 50 nm flying height, resulting in a 40 Gbit/in.$^2$ recording density. When a more standard flying height of 10 nm and recording layer thickness of 20 nm are used, recording density is expected to exceed 100 Gbit/in.$^2$.

Figure 19:
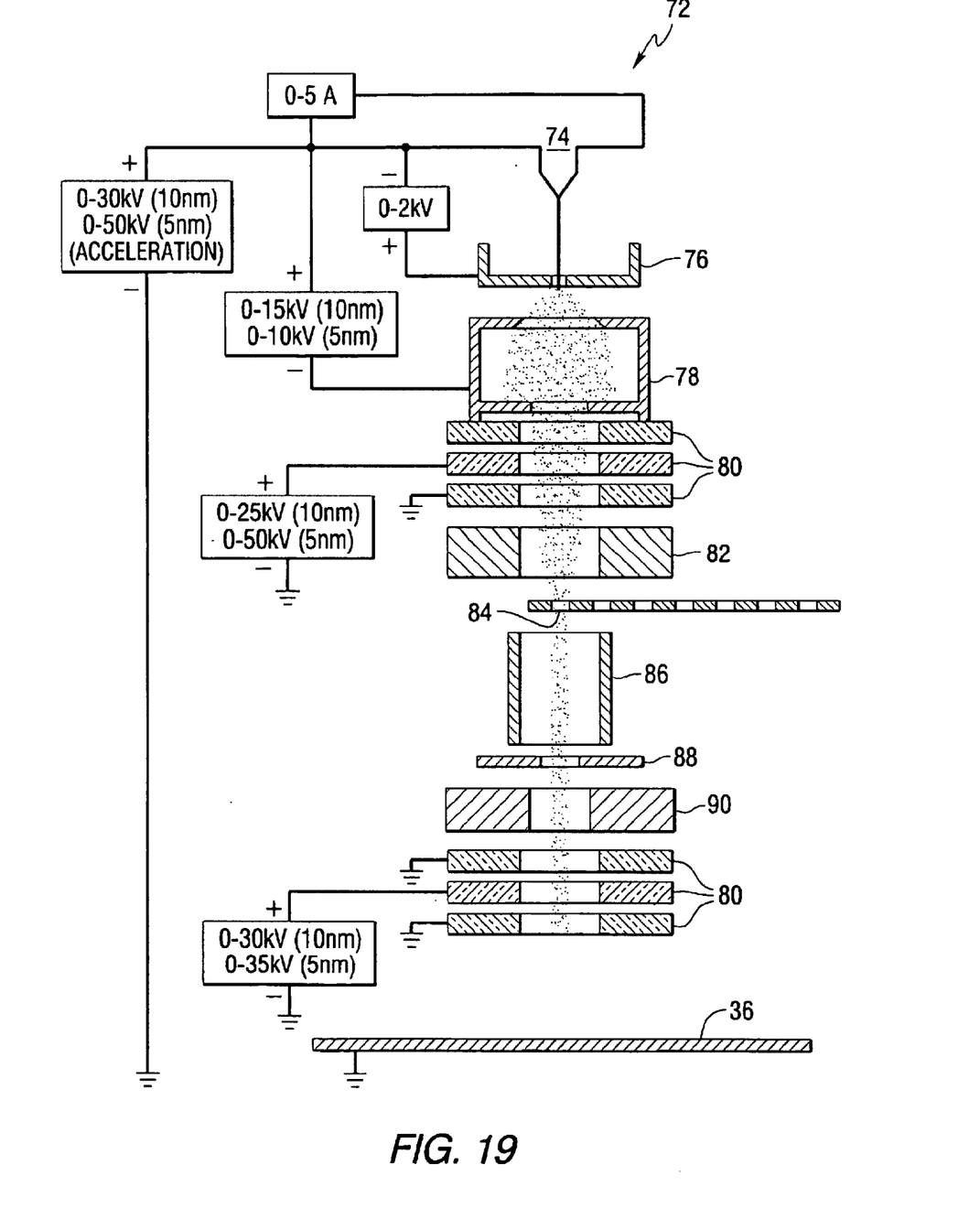
FIG. 19 is a schematic view of a focused ion beam direct etching apparatus used to produce a perpendicular recording head according to the present invention.

Preferred and suggested methods of manufacturing a main pole for the present invention include focused ion beam direct etching, electron lithography, and optical lithography, with focused ion beam direct etching being most preferred. The focused ion beam direct etching apparatus 72 is illustrated in FIG. 19. Basically, positively charged ions of liquid metals, for example gallium, are focused onto the bottom surface 36 (illustrated schematically) to etch the cavity 34. Ions are generated by an ion source 74, passing through suppressor 76. The ions then proceed through an extractor and spray aperture 78, which begins the focusing process. Next, the ions pass through at least one lens 80, thereby continuing to focus the ions. A stigmator 82 is placed after the first group of lenses 80. Next, the ions pass through any one of a plurality of limiting apertures 84, which may be selected to further narrow the ion beam. After exiting the aperture 84, the ions pass through a blanking deflector 86, blanking aperture 88 and deflection assembly 90. Lastly, the ions pass through at least one additional lens 80 before striking the main pole's bottom surface 36 to etch the cavity 34.

It is to be understood that the invention encompasses not only the preferred embodiments described herein but also all embodiments encompassed by the following claims.

We claim:

1. A perpendicular recording head for use with a magnetic recording medium including a flying height defined between said perpendicular recording head and said magnetic recording medium, said perpendicular recording head comprising:

a magnetically permeable main pole having a substantially uniform cross-sectional thickness and a width along a length of the main pole and including a tip defining a cavity dimensioned and configured to concentrate magnetic flux from said perpendicular recording head at a distance approximating the flying height of the perpendicular recording head, wherein a portion of the tip comprises a flat planar surface parallel with a surface of the magnetic recording medium and the cavity extends across the entire thickness and/or width of the main pole; and an electrically conductive coil dimensioned and configured to generate a magnetic field in the main pole.

2. A perpendicular recording head according to claim 1, wherein said cavity is substantially concave.

3. A perpendicular recording head according to claim 2, wherein said cavity defines a substantially hemispherical shape.

4. A perpendicular recording head according to claim 2, wherein said cavity is curved.

5. A magnetic recording apparatus, comprising:

a perpendicular recording head comprising a magnetically permeable main pole having a substantially uniform cross-sectional thickness and a width along a length of the main pole and including a tip defining a cavity extending across the entire thickness and/or width of the main pole, wherein a portion of the tip comprises a flat planar surface; and a magnetic recording medium spaced from the recording head by a flying height, wherein the flat planar surface of the tip is parallel with a surface of the magnetic recording medium, and the cavity is dimensioned and configured to concentrate magnetic flux from the main pole at a distance approximating the flying height.

6. A magnetic recording apparatus according to claim 5, wherein said cavity is substantially concave.

7. A magnetic recording apparatus according to claim 6, wherein said cavity defines a substantially hemispherical shape.

8. A magnetic recording apparatus according to claim 6, wherein said cavity is curved.

* * * * *